Patented Jan. 24, 1933

1,894,948

UNITED STATES PATENT OFFICE

WERNER ESPE, OF BERLIN-CHARLOTTENBURG, AND HANS KOLLIGS, OF BERLIN, GERMANY, ASSIGNORS TO SIEMENS & HALSKE AKTIENGESELLSCHAFT, OF SIEMENSSTADT NEAR BERLIN, GERMANY, A GERMAN COMPANY

MANUFACTURE OF ELECTRON DISCHARGE DEVICES

No Drawing. Application filed September 23, 1930, Serial No. 483,967, and in Germany October 29, 1929.

This invention relates to a method of producing gas absorbing metallic layers in electron discharge devices or of activating incandescent cathodes with the aid of metals of the alkaline or earth alkaline metal group which are produced in the device in the known manner by decomposing chemical compounds of these metals. It is known in the art in the production of earth alkaline metals to employ a mixture consisting of a compound of one of these metals, for example, barium oxide and metallic aluminum or an equivalent metal such as magnesium. The barium oxide and aluminum mixture must be introduced into the discharge device very quickly or the barium oxide will absorb moisture from the air and form barium hydroxide, and water vapor will then be freed in the device and react chemically in the final reaction with the greater part of the metallic barium.

In accordance with the present invention the alkaline earth metal oxide is produced in the device itself from compounds or alloys which are not affected by air. The by-products produced at the same time must be either vaporous so that they may be pumped out or they must have such a high vapor pressure that they do not affect the normal operation of the device. The alkaline earth metal oxide is caused to react with aluminum or the like, for the purpose of forming the metal necessary for absorbing residual gases in the device or activating the cathode, in any well known manner such as by heating to a sufficiently high temperature.

In utilizing the method of this invention, barium carbonate which is mixed with aluminum powder is employed instead of barium oxide as heretofore. Before the actual reaction the barium carbonate divides into barium oxide and carbon dioxide, the latter of which is removed by a pump. The barium oxide and the aluminum mixture then react at approximately 1100° C. and metallic barium is formed.

Barium nitride may also be used instead of barium carbonate. Barium nitride readily decomposes into metallic barium and nitrogen at a temperature which is below the temperature employed in the degassing of the metal parts of the tube. The barium compound is to be decomposed only at temperatures above those employed in the degassing process in order to prevent the gasses emanating from the metal parts from combining with the barium. For this reason the following method should be employed when using barium nitride as the initial substance. Barium nitride is mixed with aluminum powder and introduced into the tube. The barium nitride is then decomposed by heating and oxidized again by the subsequent addition of dry oxygen. The metallic parts of the tube are then degassed at a temperature of approximately 900° C. and at approximately 1100° C. the known reaction between the aluminum and the barium oxide occurs with the resultant formation of metallic barium.

Multiple metal oxide compounds such as alkaline earth oxide—heavy metal oxide compounds, for example, barium oxide—nickel oxide, or barium oxide—copper oxide which are very stable in air may also be used in carrying out the method of this invention. These compounds decompose at about 1000° C. in vacuum into heavy metal (e. g. nickel-copper) the vapor pressure of which is so high that it does not interfere with the normal operation of the tube, oxygen which is pumped off before the final reaction, and barium oxide which is caused to react with the aluminum in the aforementioned manner at approximately 1100° C.

What is claimed is:

1. In the manufacture of electron discharge devices the method of producing free alkaline earth metal which comprises introducing a compound of said metal into the vessel of the device, decomposing said compound to an oxide, and changing said oxide in the presence of a reaction medium to liberate free metal of alkaline earth.

2. The method of producing a high vacuum in an enclosing vessel having metallic members therein which comprises introducing a compound mixture of alkaline earth and thermic material into said vessel, treating said compound to form an oxide of said metal compound, heating said metallic members to drive occluded gases therefrom, and finally reducing said oxide by thermic reaction to liberate alkaline earth metal.

3. The method of producing uncombined alkaline earth metal in an evacuated vessel which comprises introducing a mixture of a carbonate of said metal and aluminum into said vessel, decomposing said carbonate to form an oxide of said metal, and causing a reaction between said oxide and said aluminum to liberate said metal.

4. The method of producing a high vacuum in an enclosing vessel having metallic members therein, which comprises introducing a mixture of a compound of an alkaline earth metal stable in air and a reducing agent into said vessel, decomposing said compound to form an oxide of said metal, heating said metallic members to remove gases therefrom, and heating said oxide and reducing agent to liberate said metal.

5. The method of producing a high vacuum in electron discharge devices comprising an enclosing vessel and metallic electrodes therein, which comprises introducing a mixture of barium carbonate and aluminum into said vessel, decomposing said barium carbonate to form barium oxide and carbon dioxide, removing said carbon dioxide from said vessel, heating said electrodes to remove occluded gases therefrom, the intensity of said heating being insufficient to initiate a reaction between said barium oxide and aluminum, and heating said barium oxide and aluminum to form metallic barium.

In witness whereof, we hereunto subscribe our names this 30th day of August, 1930.

WERNER ESPE.
HANS KOLLIGS.